Aug. 5, 1969 W. E. LERWILL ETAL 3,459,928
CORRELATION OF VARIABLES NOT PREVIOUSLY KNOWN
Filed Sept. 15, 1964 3 Sheets-Sheet 1

INVENTORS
William Edward Lerwill
and Nigel Allister Anstey
BY
Mason, Kolehmainen, Rathburn & Wyss
ATTORNEYS

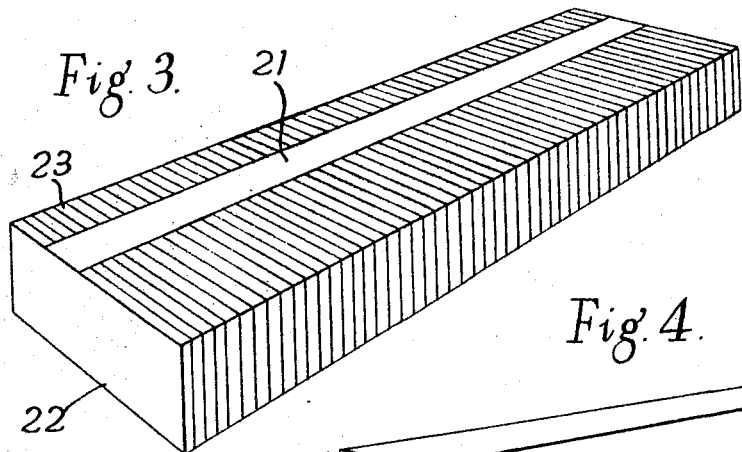
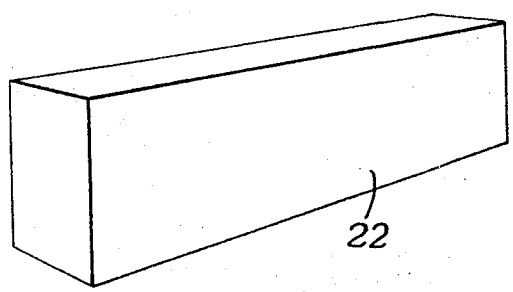
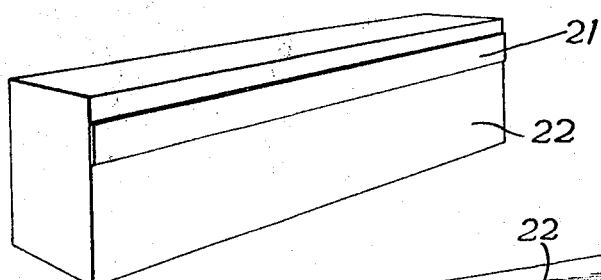
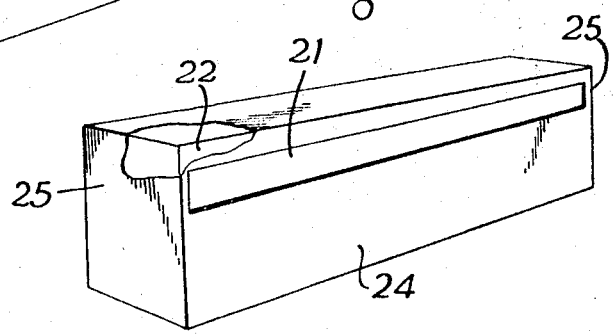
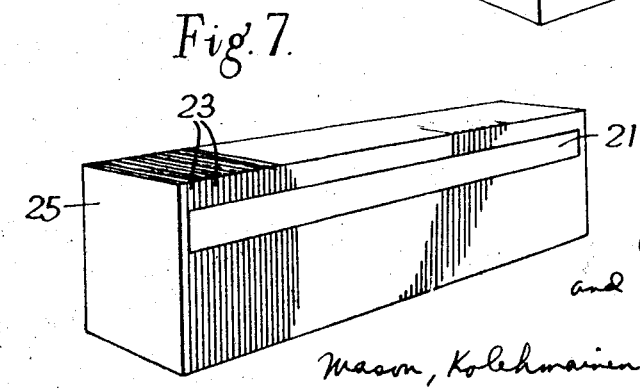

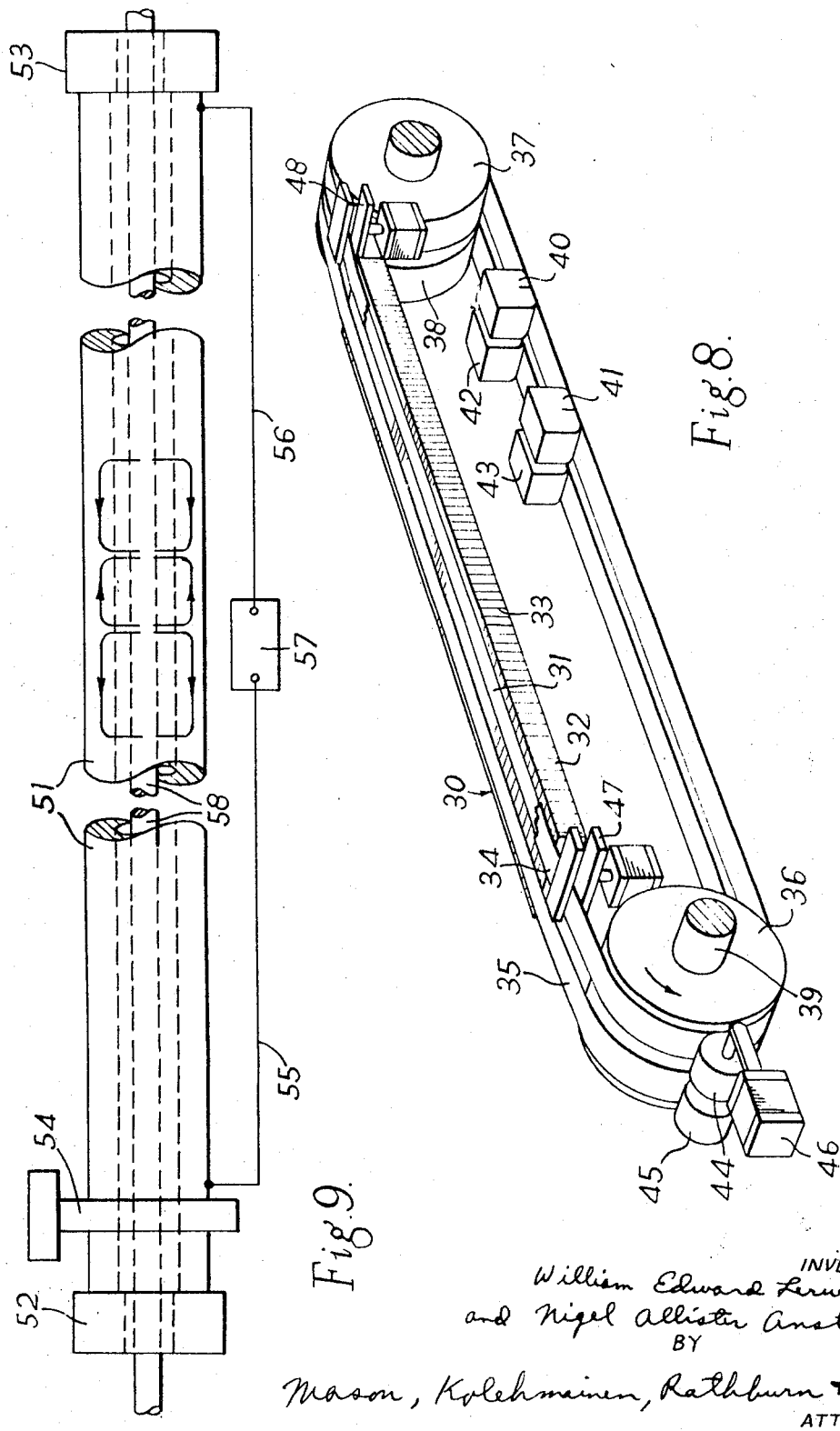

United States Patent Office

3,459,928
Patented Aug. 5, 1969

3,459,928
CORRELATION OF VARIABLES NOT PREVIOUSLY KNOWN
William Edward Lerwill, Keston, Kent, and Nigel Allister Anstey, Orpington, Kent, England, assignors to Seismograph Service Corporation, Tulsa, Okla.
Filed Sept. 15, 1964, Ser. No. 396,763
Claims priority, application Great Britain, Sept. 16, 1963, 36,352/63
Int. Cl. G06f 15/34; G06g 7/19
U.S. Cl. 235—181     16 Claims

ABSTRACT OF THE DISCLOSURE

A method and apparatus for correlating two variables wherein two energy fields of extended length respectively representing the variables interact in a single elongated correlating medium. One of the two fields is maintained in fixed position relative to the medium while a second field is moved along the medium to produce simultaneously a plurality of electrical variations each representing the combined effect of the two fields upon an elemental portion of the medium. An output signal is derived by measuring the total effect of the variations along the entire length of the medium.

---

This invention relates to methods of and apparatus for correlating two variables and it has for one of its principal objects the provision of novel and improved methods of and apparatus for doing this. In particular it is an important object of the invention to provide novel methods of and apparatus for correlating which can be used for correlating variables having characteristics which are not already known.

In the following description reference will be made to correlation, cross-correlation and auto-correlation. In this connection it may be noted that the term "correlation" is a general term which refers to an assessment of the relationship between two variables. It includes both cross-correlation and auto-correlation, which latter is a particular example of cross-correlation.

The term "cross-correlation" refers to a specific form of correlation which includes the steps of multiplying the ordinates of one variable which varies with time with those of another variable which varies with time and integrating the products over a finite period of time. Cross-correlation can be expressed as follows:

$$\phi_{gr}(\tau) = \frac{1}{T} \int_0^T g(t) \cdot r(t+\tau) \cdot dt \quad (1)$$

The above formula indicates that the ordinates of one time-varying variable $g(t)$ are multiplied by the ordinates of a second time-varying variable $r(t+\tau)$ over values of times $t$ from 0 to T.

A correlogram can be obtained by plotting values of $\phi_{gr}(\tau)$ for varying values of $\tau$. The function $\phi_{gr}(\tau)$ which is itself a function of time, is known as the cross-correlation function.

By auto-correlation there is meant the cross-correlation of variables having two identical patterns, that is when $g(t) = r(t)$.

The above Formula 1 then becomes:

$$\phi_{gg}(\tau) = \frac{1}{T} \int_0^T g(t) \cdot g(t+\tau) \cdot dt \quad (2)$$

$\phi_{gg}(\tau)$ is known as the auto-correlation function.

Correlation and more particularly cross-correlation have in recent years become very useful in many branches of science and technology and various methods of effecting cross-correlation have been devised. One most important field includes the reception and detection of signals of many types.

The need for detecting a signal in the presence of noise arises in many forms of communication and in investigations of many kinds.

These include communication by radio waves and by acoustic waves, including methods using subsonic and ultrasonic signals, as well as echo ranging, whether this is done by radio ranging (radar) or by using acoustic signals.

Other examples of cases in which such cross-correlation can be used include matched filtering, such as may be used in pulse compressive communication and echo ranging systems as well as for other purposes, pattern recognition, such as may be used for the analysis of meteorological observations, market trends and other functions, coding and de-coding, the identification of earthquakes or other disturbances of natural or other origin, the measurement of travel times or velocities of disturbances between different points in space and the determination of system transfer characteristics, which may be carried out in industrial or other systems.

The above and other uses of cross-correlation are discussed in greater detail in certain prior patent applications, including particularly applications Ser. Nos. 190,912 (filed Apr. 30, 1962 and now abandoned), 235,622 (filed Nov. 6, 1962), 243,448 (filed Dec. 10, 1962 and now abandoned but a continuation of which has issued as U.S. Patent No. 3,395,340), 249,366 (filed Jan. 4, 1963 and now U.S. Patent No. 3,271,732), 252,979 (filed Jan. 21, 1963 and now U.S. Patent No. 3,281,773).

As is explained more clearly in the specification of the said application Ser. No. 190,912, various methods of effecting cross-correlation have been proposed and used in the past. Certain of these methods make use of two magnetic recorders, but involves a very great expenditure of time and work. Other systems use digital computers, but these are very expensive, are not always available and are not easily portable.

As is more fully described in the said application Ser. No. 190,912, filed Apr. 30, 1962) as well as in the latter applications referred to above, certain novel methods and apparatus have been devised for correlating two functions or variables, including particularly cross-correlation and also auto-correlation, which offer most important and useful advantages over other previously-known methods and apparatus.

Referring briefly to these novel methods, such correlation can be carried out by simulating one of the variables to be correlated by means of a plurality of detecting elements which are distributed in space along a path traversed by an energy field whose variations with distance along this path represent the other variable to be correlated.

One method of doing this involves the provision of a magnetic recording or play-back head having a number of conducting elements which are arranged transversely across the head and which are spaced apart along it at distances which vary in accordance with a function of the first one of the variables to be correlated, the other variable being recorded on a magnetic medium which is passed over the said head, as a result of which an output representing the cross-correlation function is obtained from the head.

Another method involves the use of radio receiving aerials having conducting elements which are spaced apart in accordance with a function of a variable which is to be correlated with another variable represented by a signal which is received by the aerials.

These last methods of correlation, in spite of their great advantages, suffer from the limitation that it is necessary to have previous knowledge of one of the variables which are to be correlated, including its waveform and duration, since this variable is used in the design of part of the apparatus in or by which correlation is effected. In many cases this is not important and does not introduce disadvantages. For example, in echo-ranging the signal which is transmitted and which is to be correlated with the signal received back can generally be of a pre-determined pattern, which is determined by the design of the correlator.

There are, however, many cases in which precise information of one of the signals or other variables which are to be correlated will not be available in time and in such a way that it can be used in the design of the correlator. It would, therefore, be a great advantage to provide a method of and means for correlating two variables which does not require that one of them should be pre-programmed. It is one of the objects of the present invention to provide methods of and means for doing this which do not require that one of the variables should be known in advance, in sufficient time, to be included in the design of part of the correlator, although programming is still possible when this is required.

As will appear from the following description the present invention provides a method of and means for use in correlating two variables neither of which requires to be known in advance. By using a novel device, which represents a most important feature of the invention, in conjunction with a delay medium, which may be provided by a conventional magnetic tape or other means, it becomes possible to multiply the ordinates of two previously unknown time varying quantities or variables and to produce a voltage which is proportional to the sum of their products. In other words, the invention provides a method of and apparatus for correlating, particularly cross-correlating, two previously unknown variables, which method and apparatus offer very useful advantages over those which have been known and used in the past.

The present invention is based generally on the use of two energy fields, one representing each of two variables to be correlated, which fields are of such a nature that they interact to produce an output which represents a function, such as a product, of the two variables. By using such energy fields to represent the ordinates of the variables, as the latter vary with time, and by adding the individual outputs, cross-correlation of the two variables can be produced and this can be done rapidly and without the necessity for either variable to be incorporated in the design of the equipment used.

The invention in one of its aspects, accordingly provides a method of correlating two variables which comprises producing in a selected medium two energy fields having characteristics which represent the respective variables, which energy fields interact in the said medium to produce in the latter an electrical characteristic, variations in which represent a correlation of the said two variables.

The invention further provides apparatus for correlating two variables comprising a correlating member and means for producing two energy fields, which fields have patterns which are characteric of the respective variables and interact in the material of the said member to produce in the member variations which represent a correlation of the two variables.

Amongst the energy fields which may be used are magnetic and electrical fields, including particularly the interaction between a magnetic field and an electrical field produced by a current passing through the magnetic field in a material which is subject to the Hall effect. This represents a most important aspect of the invention and it will be more fully described hereinafter.

Other possible methods of applying the invention make use of interaction, which may be direct or indirect, between other fields; these include magnetic and strain fields in a magneto-strictive material, to give one example.

Dealing first with the use of the Hall effect in the application of the invention, this effect may be stated here as follows:

If a current is caused to flow along a conductor and there exists a magnetic field having a component at right angles to the direction of such current flow in the conductor, then an electromotive force will appear across the conductor in a direction transverse to the direction of current flow and at right angles to the magnetic field passing through the conductor.

For the better understanding of the invention reference will be made to the accompanying drawings, in which:

FIGURE 3 illustrates in greater detail, but still somewhat diagrammatically, a device forming part of apparatus which may be used for carrying out the invention by the method described with reference to FIGURE 2;

FIGURES 4, 5, 6 and 7 illustrates, again rather diagrammatically, how the device shown in FIGURE 3 may be constructed;

FIGURE 8 shows, in greater detail but still diagrammatically, a preferred form of correlating apparatus which utilises the Hall effect and which exemplifies the present invention;

FIGURE 9 illustrates, very diagrammatically, another form of correlating apparatus which exemplifies the invention and which makes use of interaction between magnetic and strain fields in a magneto-strictive material.

The use of the Hall effect to carry out the invention, being the method which is at present preferred, will first be considered and described.

Figure 1:
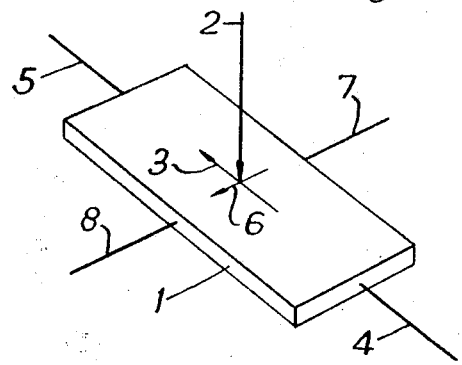
FIGURE 1 is a diagram illustrating the Hall effect.

The conductor which is employed to demonstrate or use the Hall effect generally takes the form of a flat plate and it will be referred to as a Hall plate in the following description and in appended claims, although the invention is not necessarily limited to the use of flat plates, even though such plates at present give the best results. Such a Hall plate is shown at 1 in FIGURE 1. Although it may be made of metal or of another conductor it will in practice be made of a selected semi-conductor, since the Hall effect can be much greater for these than it is for ordinary conductors.

If the plate 1, which has a thickness of $d$ centimetres is put in a magnetic field of $B_y$ Gauss, which field is perpendicular to the plane of the plate and the direction of which is indicated by the arrow 2, and if a current of $I_x$ amperes is passed along the length of the plate in the direction of the arrow 3, which current may be supplied through conductors 4 and 5, then a potential difference of $V_H$ volts will be produced in the direction of the arrow 6 between the sides of the plate 1, to which conductors 7 and 8 can be connected.

The magnitude of $V_H$ is determined by the equation:

$$V_H = \frac{R_H \cdot B_y \cdot i_x \cdot 10^{-8}}{d}$$

$R_H$ is the Hall coefficient of the material of the plate 1 and, as has been stated, it is very much greater for many semi-conductors than it is for metals. This and the fact that the voltage $V_H$ is proportional to the product of the current $I_x$ and the flux density $B_y$ enable the Hall plate to be used very conveniently as an analogue multiplier.

The present invention, in one of its aspects, is based on the idea of using a large number of current connections or probes, which are provided on a common Hall plate, the provision of suitable means for producing through this Hall plate a magnetic field, variations of which field along the plate represent one of the variables to be correlated, and the provision of means for inducing voltages in the connections or probes which represent the other of the variables to be correlated, whereby currents are caused to pass across the Hall plate along parallel paths which which intersect the magnetic field, as a result of which voltages are induced along the plate the algebraic sum of which voltages represents a correlation, particularly a cross-correlation, of the variables to be correlated.

Figure 2:
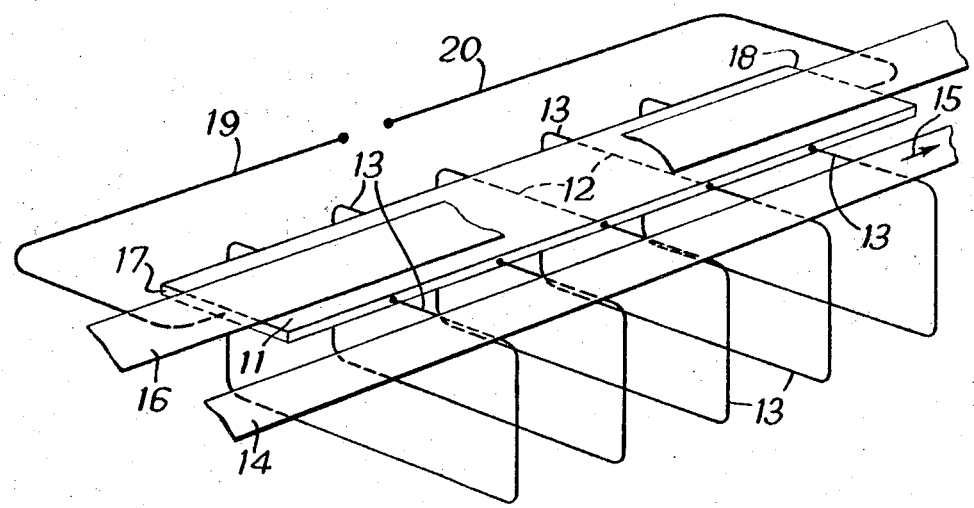
FIGURE 2 shows, purely diagrammatically, one method of and apparatus for using the Hall effect to apply the present invention.

Referring now to FIGURE 2, this shows diagrammatically one method of applying the invention in which a magnetic recording tape is used to induce the currents which are passed through the Hall plate while another magnetic tape, which in this case is stationary although it may be adjustable along the Hall plate, is used to produce the magnetic fields through the plate. One signal or other variable to be correlated is recorded on one tape and the other on the other tape.

In FIGURE 2 the Hall plate is indicated at 11 and, as will be seen, it is of considerable length. Furthermore, the current is passed through it transversely along closely spaced parallel paths, such as 12, for which purpose a number of conductors 13 are connected to the opposite side edges of the plate 11. For the sake of clarity only five such conductors, which are in the form of closed conducting loops, are shown, but in practice there would be many and closely spaced conductors 13 and paths 12 across the plate. There may in fact be as many as 200 per inch, the limit being determined by manufacturing considerations.

One of the variables $r(t)$ to be correlated is recorded in a conventional longitudinal manner on a magnetic tape 14, which passes over the conductors 13 in the direction of the arrow 15. Movement of the tape 14 over the conductors 13 induces currents in the conductors and these currents pass through the plate 11 along the parallel paths 12, which are transverse to the length of the plate. These currents may be referred to as $i_{x_1}, i_{x_2}, i_{x_3} \ldots i_{x_n}$ and they are related to the pattern of the variable or function $r(t)$ as recorded on the tape 14.

The other variable $g(t)$, which is to be correlated with $r(t)$, is recorded on a second magnetic tape 16 which extends along the plate 11 and is of a width comparable with that of the plate. The tape 16 is not, in this application of the invention, made to travel along the plate 11, atlhough it may be adjusted along it. The magnetisation of the tape 16 induces magnetic fields extending through the thickness of the plate 11. These fields may be referred to as $B_{y_1}, B_{y_2}, B_{y_3} \ldots B_{y_n}$.

It will thus be seen that when the tape 14 travels over the conductors 13 the resulting currents $i_{x_1}, i_{x_2} \ldots$ etc. are passed along the closely-spaced parallel paths 12 transversely of the plate 11, where they interact the magnetic fields $B_{y_1}, B_{y_2} \ldots$ etc., which are produced by the magnetised tape 14. At the points of intersection electrical voltages $V_{H_1}, V_{H_2}, \ldots$ etc. will be produced, as a result of the Hall effect, in directions which are transverse to the directions of the fields and to the paths 12, that is in a direction extending longitudinally along the plate 11 between the ends 17 and 18 thereof. The magnitudes of these voltages will be determined by the magnitudes of the respective fields $B_{y_1} B_{y_2}$, etc. and of the currents $i_{x_1}, i_{x_2}$, etc. which intersect them and by the Hall coefficient of the plate 11, while the directions of these voltages will be determined by the directions of the fields and of the currents.

All the voltages $V_{H_1}, V_{H_2}, \ldots V_{H_n}$ will add together algebraically along the length of the plate 11 and the resulting voltage between the ends 17 and 18 of this plate, to which conductors 19 and 20 are connected, will represent a cross-correlation of $g(t)$ and $r(t)$.

As has been stated, for best results, the Hall plate will normally be made of a semi-conducting material, which will generally be selected as one having a high Hall coefficient. Examples of such materials are indium arsenide and indium antimonide. Such semi-conductors are often brittle and difficult to work, while for best results the plate has to be thin. Furthermore, in carrying out the present invention, the conductors which are connected to the plate to provide the parallel paths of electrical conduction across the latter require to be closely spaced. The provision of a device which meets these requirements, and of methods of making it, represent important features of the present invention.

Such a device is shown, somewhat diagrammatically in FIGURE 3 of the drawings, in which the reference 21 indicates a Hall plate made of indium antimonide or other suitable semi-conductor. This plate is mounted on a block 22, which block, according to a preferred feature of this invention, is made of a magnetic material which is a poor conductor of electricity. Such materials are provided by magnetic ceramics, an example of which is supplied by Mullard Ltd. under the name "Ferroxcube."

Furthermore, and again this forms a useful feature of this invention, the conducting paths, here indicated at 23, which lead to the opposite side edges of the plate 21 and which are in the form of closed loops corresponding to those indicated at 13 in FIGURE 2, are carried by and surround the block 22, being preferably formed by depositing a conducting metal, such as copper, on the surface of the block 22, while ensuring that air space or other insulation is provided between, to define and separate, the conducting loops 23. One method by which this may be done is shown in FIGURES 4 to 7 of the drawings.

Referring to these figures a block 22 of "Ferroxcube" or of another suitable magnetic ceramic is cut and ground to shape with its opposite faces parallel. A long, thin Hall plate 21 made of indium antimonide or other suitable material is then secured along one face of the block 22 in the position shown in FIGURE 5, which may be done using a suitable bonding agent or adhesive. This plate 21 is then lapped to a suitable thickness which, in the case of indium antimonide, may be about 0.04 mm. or less.

The entire surface of the block 22 is then electroplated with copper or other conducting metal to form a conducting coating 24 (FIGURE 6), which extends up to and makes contact with both the side and end surfaces of the plate 21, but without covering the outer surface of the latter. The thickness of this conducting coating 24 preferably corresponds to that of the plate 21, as is shown in FIGURE 6, it being noted that the thickness of the end parts 25 of the coating, where they overlap the ends of the plate 21, is shown exaggerated in this figure, as is the thickness of the plate 21 as shown in FIGURE 5.

Selected areas of the coating 24, including the entire end parts 25 of the latter and lines corresponding to the desired conducting loops 23 (FIGURES 3 and 7) are then covered with a suitable protective material and the copper between the loops 23 and between the end ones of these loops and the end plates 25 is removed by etching. This leaves the required conducting loops 23, the ends of which loops connect with the sides of the plate 21, and also the end plates 25 which connect with the ends of the Hall plate 21 and to which electrical connections for the latter can be made.

It is also possible to make the conducting loops 23 by controlled evaporation, and also to deposit the material of the Hall plate by evaporation. This restricts the type of metal which may be used for the Hall plate, but it allows a smaller thickness of metal; to some extent these changes may be made to counteract each other. The conductors and the Hall plate may be evaporated onto the block in two separate operations, each operation being associated with an appropriate mask.

To use the device shown in FIGURES 3 and 7 it is arranged in suitable apparatus such that one magnetic tape, on which one of the variables to be correlated has been recorded, is made to lie along or to travel along over the Hall plate 21, while another magnetic tape on which the second variable to be correlated has been recorded is made to travel over the conductors 23 along a path which is parallel to the length of the plate 21 and to the first tape. The voltage appearing between the end plates 25 of the unit will represent a cross-correlation of the two variables.

It will be apparent that the variables to be correlated do not have to be known when the device shown in FIGURES 3 to 7 is being constructed. It is merely necessary that the two variables should be recorded on magnetic tapes.

Referring now to FIGURE 8, this shows correlating apparatus having a correlating unit or device 30 which is similar to the one which has been described with reference to FIGURE 3. Thus this device includes a long Hall plate 31 which is carried by a magnetic ceramic block 32, which latter carries conducting loops 33. Output connections (not shown) are taken from the ends of the plate 31.

Two magnetic tapes 34 and 35 are arranged to pass side-by-side along the block 32, the tape 34 passing over the Hall plate 31 and the tape 35 passing over the conducting loops 33 along a path which is parallel to the tape 34.

The tapes 34 and 35 which are in the form of endless loops, are carried by rollers 36, 37 and 38, the roller 36 being a driving roller which is common to the two tapes. It is mounted on a shaft 39 which is driven from an electric motor (not shown) through suitable reduction gearing. The rollers 37 and 38 are independent tensioning rollers for the tapes and may be provided with separate adjusting means (not shown).

Recording and erase heads 40 and 41, respectively, are provided for the tape 34, whilst similar heads 42 and 43 respectively, are provided for the tape 35.

When the apparatus is to be used, signals representing the two variables to be correlated are recorded on the tapes 34 and 35 whilst the latter are being driven at the same speed by the roller 36 past the recording heads 40 and 42. Recording on the two tapes may be effected simultaneously or at different times, depending on circumstances.

Although the driving roller 36 may be used to drive both the tapes 34 and 35 whilst recording is being effected on one or both of them and is used to adjust the position of the tape 34 relatively to the Hall plate 31 before correlation is started, this roller is arranged to drive only the tape 35 whilst correlation is being actually carried out.

To ensure this, separate pinch rollers 44 and 45 are provided for the tapes 34 and 35 respectively, but whilst the pinch roller 45 is always effective to cause the roller 38 to drive the tape 35, means including a solenoid 46 are provided for retracting the roller 44 during correlating so as to allow the roller 38 to rotate without driving the tape 34. Furthermore, two solenoid operated clamps, which are indicated purely diagrammatically at 47 and 48, are provided for clamping the tape 34 in position when the pinch roller 44 is inoperative.

The operation of the above apparatus will be clear from the preceding description. Signals representing the two variables to be correlated are first recorded on the tapes 34 and 35, using the recording heads 40 and 42, any previous recordings being erased by the heads 41 and 43. Whilst recording is being effected on the tape 34 the pinch roller 44 is allowed to act on it, whilst the clamps 47 and 48 are disengaged, so as to allow the tape 34 to be driven by rotation of the roller 38. After recording has been completed on it, however, the tape 34, after being adjusted to bring the required part of the recording which represents the first of the variables to be correlated over the Hall plate 31, is then locked in position, by operating the clamps 47 and 48, and the pinch roller 44 is disengaged from it.

To effect correlation the apparatus is operated to cause the tape 35 to travel over the conducting loops 33, when it will induce in these loops and across the Hall plate 31 electric currents which will be related to the second of the variables to be correlated. The passage of these currents through the material of the Hall plate within the magnetic fields produced in the latter by the magnetised tape 35 will generate between the ends of the plate 31 a voltage which will represent a cross-correlation of the two variables. This voltage, after amplification in a suitable amplifier (not shown) may be recorded or displayed in any suitable way.

It will be understood that the erase heads 41 and 43 may be rendered inoperative during correlation or at other times when erasure from the tapes is not required.

While it is at present preferred to make use of the Hall effect to carry out the invention, other methods of producing interacting energy fields which represent the two variables to be correlated are possible. One of these involves the interaction between magnetic and strain fields in a magneto-strictive material. For example, a rod or tube made of a magneto-strictive material may be placed in a longitudinally-extending magnetic field representing one of two variables to be correlated and may be subjected to a torsional twist representing the other of the variables. The result of this will be to produce an electrical voltage between the ends of the rod which will represent a correlation of the two variables.

Thus, referring to FIGURE 9, a magnetostrictive member in the form of a thin walled tube 51 is shown largely diagrammatically and with its diameter and wall thickness exaggerated in the drawing. The ends of this magnetostrictive tube are secured to resistive terminations 52 and 53 in which torsional waves produced in the tube are absorbed. These waves are generated by a launching transducer which is shown diagrammatically at 54 and which is connected with the tube 51 near the termination 52. The apparatus so far described is similar in its construction to known forms of magnetostrictive apparatus and will not be further described.

In the present apparatus however, output connections 55 and 56 are taken from the tube 51 at points near the transducer 54 and the termination 53 respectively, and are connected to an amplifier 57, whilst means are provided for guiding a magnetised wire 58 along the axis of the tube 51. This wire, which may be magnetised on a magnetic wire recorder, has one of the variables to be correlated recorded on it and it takes the place of the tape 34 of FIGURE 8. The wire 58 may, in fact be carried by a pair of grooved rollers (not shown) corresponding to the rollers 36 and 37 of FIGURE 8.

The wire 58 is covered with a thin insulating film which is insufficiently thick to impair the recording of magnetic signals on it but which prevents any short-circuiting of the tube 51. Alternatively the tube 51 may itself be insulated on its inner surface.

To use the apparatus of FIGURE 9, one of the variables is recorded on the wire 58 and the latter is adjusted to bring the required part of the recording within the tube 51.

The magnetic recording on the wire 58 will produce north and south poles along it, such as are indicated in FIGURE 9, where the distances between the poles are shown as being different along the wire owing to variations in the frequency of the recorded signal. As a result the wire 58 will produce magnetic fields having the form of loops which are completed within the magneto-strictive material of the tube 51 in a manner which is indicated in the drawing.

Each elementary section of the tube 51, being in a longitudinal magnetic field, will generate a voltage between its ends if it is twisted. The total voltage output of the tube will be the integral, over the effective length of the tube, of the local products of the longitudinal component of the magnetic induction and the torsional strain.

Thus, if an electrical signal representing the other of the variables to be correlated is fed to the transducer 54, causing the latter to apply torsional twist forces to the tube 51 representing this variable, a voltage will be generated between the connections 55 and 56. This voltage, which is applied to and amplified by the amplifier 57 and which may then be recorded or displayed in any suitable way, will be a function of the running cross-correlation of the signal applied to the launching transducer 54 with the pattern of magnetisation recorded on the wire 58.

If the apparatus shown in FIGURE 9 is used for pulse-compressive echo-ranging (typically in the high kilocycle or low megacycle range), the transmitted search signal may be derived from a second unit containing either a "complementary" wire recording in conjunction with a pulse input to the launching transducer, or an identical wire recording in conjunction with a pulsed launching transducer at the remote end of the tube.

We claim:
1. Apparatus for correlating two variables comprising:
    an elongated correlating member formed of a material exhibiting the Hall effect;
    means for developing two elongated energy fields one of which is a magnetic field having variations spaced along the longitudinal axis of the correlating member, representing one of the variables, and the other of which is an electric field having variations spaced along said axis representing the other of the variables said fields being positioned to produced in said member potential variations spaced along the length of the member; and
    means connected to the ends of said correlating member for measuring the total potential developed along said member to provide an indication of the correlation of the two variables over the length of the correlating member.

2. Apparatus according to claim 1, wherein the means for developing the magnetic field include a magnetic record medium on which a signal representing one of the variables is recorded and which medium is arranged along the correlating member parallel to the said axis, and wherein the means for developing the electrical field include conducting loops, which extend through the correlating member transverse to the said axis, the means for developing the other energy field including another magnetic recording medium on which a signal representing said other variable is recorded and means for passing said another magnetic recording medium past the conducting loops to generate in the latter electric currents which represent the said other variable.

3. Apparatus according to claim 2, wherein the said correlating member is in the form of a Hall plate which is mounted on a support made of an electrically insulating magnetic material, and wherein the conducting loops are provided by spaced apart lines of electrically conducting materials each extending around the support and means connecting said lines of materials to spaced apart points along the side edges of the Hall plate.

4. Apparatus for correlating two variables comprising:
    an elongated Hall plate;
    a plurality of electrical connections spaced along each of the opposite sides of said plate forming pairs of connections, one connection of each pair lying on one side of the plate and the other connection of each pair lying on the other side of the plate;
    means for producing a magnetic field through the Hall plate having variations extending longitudinally of the plate representing one of the variables;
    means for producing voltages representing the other of the variables between said pairs of connections, and including electrically conducting loops each of which is connected to one pair of said connections thereby to produce currents passing across the plate along paths which intersect the magnetic field so as to generate potential changes along the length of the plate;
    and means connected to the end of said plate for measuring the algebraic sum of said potential changes to provide an indication of the correlation of two variables over the length of the plate.

5. Apparatus according to claim 4, wherein the said pairs of connections are so disposed and arranged as to provide closely spaced parallel paths across the Hall plate substantially at right angles to the longitudinal axis thereof and to the paths of the magnetic field through the plate.

6. Apparatus according to claim 4, wherein the Hall plate is mounted on a support made of an electrically insulating magnetic material.

7. Apparatus according to claim 6, wherein the conducting loops are provided by lines of metal secured to and extending around the support.

8. Apparatus according to claim 4, wherein the means for producing the said magnetic field includes a magnetic recording medium on which a signal representing one of the said variables is recorded, and means for positioning said medium adjacent and alongside the Hall plate.

9. A device for simultaneously reading two signals represented by magnetic field intensities on magnetic recording media and for delivering an output in the form of a voltage representing the degree of cross-correlation of the signal intensities compared, comprising:
    (a) Hall-effect semiconductor generator means operatively disposed to be permeated by a first magnetic field of one of said media;
    (b) conductive loop means disposed in a second one of said magnetic fields and connected to the generator means to pass a current therethrough which is induced in the loop means by motion of the second of said media, the current passing through the generator means at right angles to the path of said first field; and
    (c) output means coupled to said generator means at points thereof mutually spaced in a direction substantially normal to the first magnetic field and to the path of the current induced by the second magnetic field.

10. A method of correlating two variables which comprises producing in a single elongated medium exhibiting the Hall effect two energy fields, a first magnetic energy field produced by magnetic recording and extending into the medium substantially at right angles to the longitudinal axis thereof and having variations along the medium representing the variations in one of said variables, and an electric energy field produced by passing a series of electric currents through the medium along closely spaced and substantially parallel paths which are distributed along the medium substantially at right angles to the length thereof and to the direction of the magnetic field, and variations in which along the medium represent variations in the other of said variables, maintaining the electric field in a fixed position relative to the longitudinal axis of said medium, moving the magnetic field relative to said electric field and the medium so that both of said energy fields interact simultaneously at a plurality of points spaced longitudinally along said medium to produce in the latter a plurality of electrical characteristic variations, and combining said electrical characteristic variations to determine the correlation of the said two variables over the length of the medium.

11. A method according to claim 10, wherein the electric currents are generated in closed loops passing through the medium by first producing another magnetic field, and moving the latter field past the loops in a direction which is substantially parallel to the length of the medium.

12. A method according to claim 11, wherein the first magnetic field is produced by recording on a first magnetic tape a signal representing one of the variables positioning said tape along said medium, and said another magnetic field being produced by recording on a second magnetic tape a signal representing the other of the variables, the moving step being accomplished by transporting said second tape past the loops.

13. Apparatus for correlating two variables comprising:
    an elongated correlating member formed of a length of magnetostrictive material;
    means for producing two elongated energy fields including means for developing a magnetic field having variations along the path of the correlating member representing variations in one of the variables and means for developing a strain field produced by torsional forces applied to the correlating member and having variations along the path of the correlating member representing variations in the other of the variables, said fields being positioned to produce in said member potential variations spaced along the length of the member; and means connected to the ends of said member for measuring the total potential developed along said member to provide an indication of the correlation of the two variables over the length of the correlating member.

14. Apparatus according to claim 13, wherein the correlating member is in the form of a tube, electrical connections adjacent the opposite ends of said tube, the means for developing said magnetic field including a magnetized wire extending along said tube and means electrically insulating the wire from the tube.

15. A method of correlating two variables which comprises producing in a length of magnetostrictive material two energy fields extending lengthwise of the material and respectively having characteristics which represent the two variables, one of the energy fields being a magnetic field extending into the medium substantially at right angles to the length thereof and produced by recording so that variations in the magnetic field in the medium represent one of the said variables and the other of said energy fields being produced by applying torsional forces to the medium, maintaining the magnetic field in fixed position relative to the longitudinal axis of said medium so that both of said energy fields interact simultaneously at a plurality of points spaced longitudinally along said medium to produce in the latter a plurality of electrical characteristic variations, and measuring the electrical potential developed between electrical connections located towards opposite ends of the magnetostrictive material to determine the correlation of the said two variables over the length of the material.

16. A method according to claim 15, wherein the correlating member is in the form of a tube having electrical connections towards its opposite ends, the magnetic field being produced by the step of magnetic recording on wire, and said method comprising the additional step of passing said wire along the tube in electrically insulated relation with respect to said tube.

References Cited

UNITED STATES PATENTS

| | | | |
|---|---|---|---|
| 3,260,980 | 7/1966 | Weiss | 330—6 X |
| 3,297,981 | 1/1967 | Harney et al. | 235—181 X |
| 3,319,173 | 5/1967 | Engel | 330—6 |
| 3,310,665 | 3/1967 | Schimmel | 235—181 |
| 3,345,504 | 10/1967 | Doty | 235—181 |
| 3,041,414 | 6/1962 | Gratian | 179—100.2 |

FOREIGN PATENTS 893,449  4/1962  Great Britain.

MALCOLM A. MORRISON, Primary Examiner

FELIX D. GRUBER, Assistant Examiner

U.S. Cl. X.R.

179—100; 235—194; 324—77; 340—15